United States Patent [19]

Dick

[11] 4,408,265
[45] Oct. 4, 1983

[54] LAMP, IN PARTICULAR FOR MOTOR VEHICLES

[75] Inventor: Heinz Dick, Odenthal, Fed. Rep. of Germany

[73] Assignee: Ford Motor Company, Dearborn, Mich.

[21] Appl. No.: 254,026

[22] Filed: Apr. 14, 1981

[30] Foreign Application Priority Data

Apr. 24, 1980 [DE] Fed. Rep. of Germany ....... 3015693

[51] Int. Cl.³ ............................................... F21V 7/22
[52] U.S. Cl. .................................. 362/238; 339/17 D;
362/80; 362/240; 362/241; 362/247; 362/297;
362/310; 362/327; 362/335; 362/347; 362/308;
362/346; 362/362
[58] Field of Search ................... 362/61, 297, 346, 82,
362/80, 240, 238, 241, 347, 350, 352, 458;
339/17 D, 176 L

[56] References Cited

U.S. PATENT DOCUMENTS

| | | | |
|---|---|---|---|
| 2,968,033 | 1/1961 | Kreitzberg | 362/346 X |
| 3,015,718 | 1/1962 | Petri | 339/17 D |
| 4,060,721 | 11/1977 | Hanson et al. | 362/346 X |
| 4,061,913 | 12/1977 | Ross | 362/352 X |
| 4,246,632 | 1/1981 | Hancox | 362/61 X |

FOREIGN PATENT DOCUMENTS

| | | |
|---|---|---|
| 1131536 | 6/1962 | Fed. Rep. of Germany . |
| 7211646 | 12/1972 | Fed. Rep. of Germany . |
| 2441330 | 3/1976 | Fed. Rep. of Germany . |
| 1564605 | 4/1980 | United Kingdom ............. 339/17 D |
| 2074710 | 11/1981 | United Kingdom ................... 362/61 |

*Primary Examiner*—Peter A. Nelson
*Assistant Examiner*—John S. Maples
*Attorney, Agent, or Firm*—Paul K. Godwin, Jr.; Clifford L. Sadler

[57] ABSTRACT

A lamp assembly for containing a plurality of light emitting lamps associated with distinct light emitting areas on a lens element and associated reflectors to direct the light towards the lens element. The light reflector element is formed of an electrically conducting sheet material subdivided into a plurality of electrically isolated areas for each defined light emitting area wherein each subdivision provides separate electrical connection between an externally supplied voltage source and its associated lamp.

6 Claims, 4 Drawing Figures

LAMP, IN PARTICULAR FOR MOTOR VEHICLES

BACKGROUND OF THE INVENTION

1. Field of the Invention

The present invention is directed to the field of lamp assemblies intended for use on motor vehicles and more specifically to the area of lamp assemblies which utilize metallized light reflectors as electrical conductors for lamps within the assembly.

2. Description of the Prior Art

In German design Pat. No. 7211646, a metallized flat surfaced reflector provides a common electrical ground connection for a plurality of lamps mounted within the assembly. A void portion is provided behind the bulbs and the metallized reflector for electrical contactors for the respective positive voltage connection to the central contacts of the bulbs. The positive voltage contactors appear to require separate installations and wiring.

German Patent Auslegeschrift 1131536 illustrates the use of a separate contoured reflector surface for each bulb in a lamp assembly. The reflector elements each provide electrical connection between an externally accessible contact and an associated lamp base. The reflector elements serve as the sockets for inserting the lamp bases. The central contact of each lamp is made to contact the grounded rear cover of the lamp housing, which is formed of sheet metal. The reflector surfaces associated with each bulb are insulated by means of rubber inserts which lock into the metal rear cover of the lamp housing.

German Patent auslegeschrift no. 2441330 illustrates a lamp assembly in which a metal plate is punched out to form a continuous grounding connection for a plurality of lamps inserted therein and a plurality of separate conductors interconnected to a multi-contact terminal to provide position electrical voltage connection to the central contacts on each of the lamps within the assembly. The reflector is formed as a unitary piece to define separate reflective sections that surround each of the lamps and to define partitions between the lamp reflector sections.

SUMMARY OF THE INVENTION

It is an object of the present invention to provide an improved lamp assembly which utilizes a reflector element to perform the dual functions of reflecting light from an associated lamp and to provide all electrical power connections between an externally associated power source and the lamp bases. The present invention achieves the objective in a desire to provide a simply constructed lamp assembly with a minimal number of parts and at a significant weight savings.

In the present invention, the reflector element utilized in the lamp assembly is subdivided into several distinct and electrically isolated sub-areas that collectively constitute a reflector for each associated lamp. Each electrically isolated sub-area provides distinct electrical connections to appropriate contacts on the base of each lamp. Sub-areas which carry common electrical potential to a plurality of lamps in the assembly are formed as continuous elements. Each sub-area is formed with a conductor run that is routed to a multiple contact plug area for connection to a multiple contact plug interconnected with an external voltage source.

DETAILED DESCRIPTION OF THE PREFERRED EMBODIMENT

Figure 1:
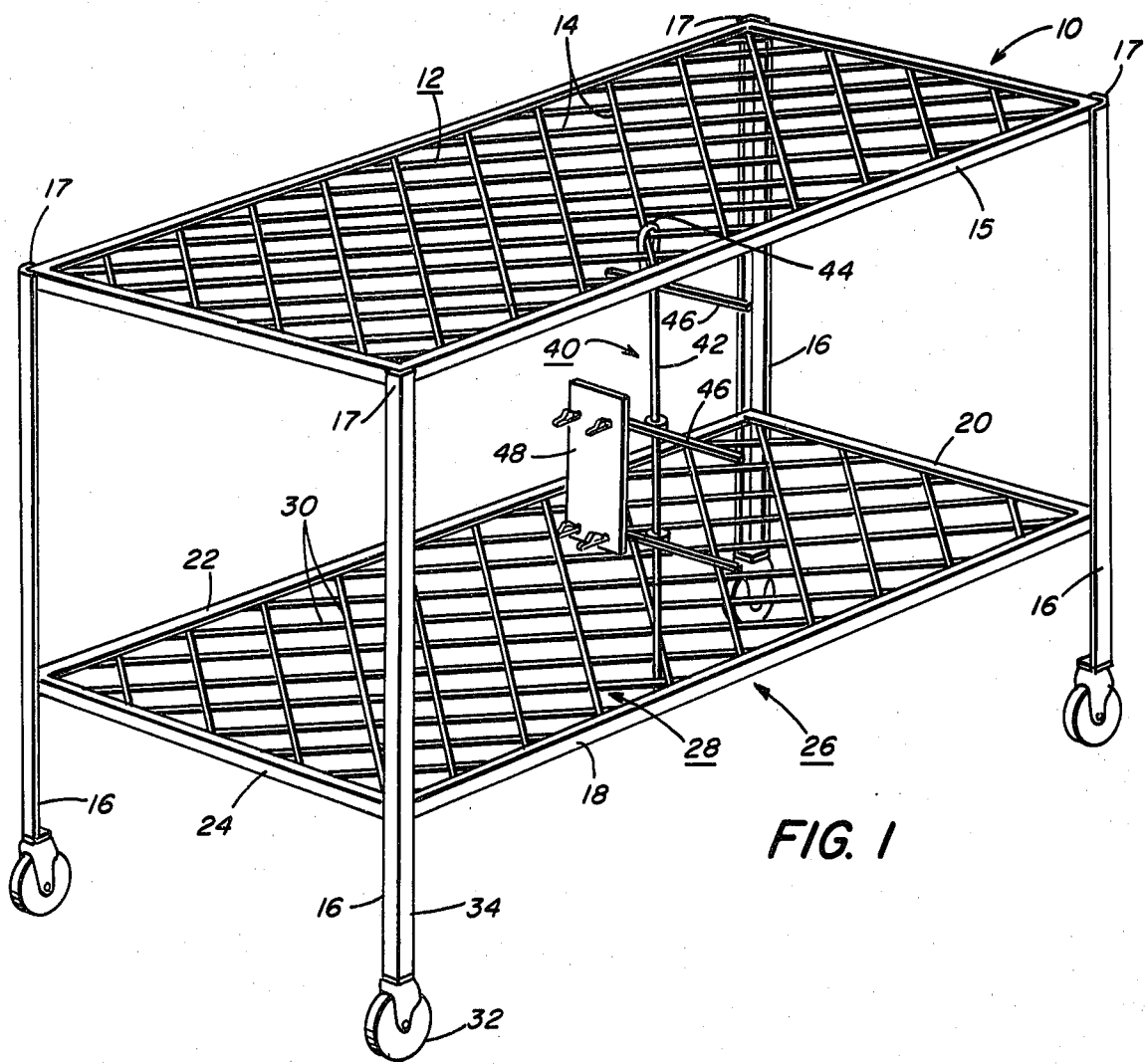
FIG. 1 is an elevational view of a lamp assembly of the present invention in the form of a rear lamp of a motor vehicle with the lens element removed.

The rear lamp assembly of a motor vehicle shown in FIGS. 1-4 includes a rear lamp cover 1 made of a hard plastic material suitable for this purpose; a lampholder 2, which is formed to function as a reflector and to provide electrical connections for the lamps; and a lens element 3 of differently colored glass or plastic portions for the various lamp sections and which is indicated by broken lines in the figures.

The lamp cover 1 is formed to provide cylindrical sockets 6; a pair of horizontal bars 4 and 5; and vertical bars 7, 8, 9 and 10 which extend to the lens element 3 to form partitions between defined light emitting areas.

The horizontal bars 4 and 5 and the vertical bars 7-10 provide mechanical support for the stamped metal lampholder 2, which, according to the present invention, is divided into reflector surfaces 16, 17, 18 and 19 for respective bulbs 12, 13, 14 and 15. Reflector surfaces 16, 17 and 19 are each divided into separate and electrically isolated reflector sub-areas 16a; 16b; 17a; 17b; and 19a; 19b; respectively. In the case of the two filament bulb 14, the reflector surface 18 is divided into three separate and electrically isolated reflector sub-areas 18a, 18b and 18c.

The reflector sub-areas 16a, 17a, 18a and 19a are shown as electrically isolated from others but continuous with each other and as formed with an electrical conductor run for connection to ground at a multiple contact plug connection area 20. The reflector sub-areas 16a, 17a, 18a and 19a each have cylindrical socket liners formed therein to provide electrical contact with the base of the associated lamps and to retain the lamps within the sockets 6.

The reflector sub-areas 16b; 17b; 19b; 18b and 18c each provide support and electrical connection to a spring contact 21 for the central contact in the base of the associated bulbs 12, 13 and 15 and for the two central contacts in the base of the double filament bulb 14. The reflector sub-areas 16b; 17b; 18b; 18c and 19b are formed with punched conductor runs that extend into the multiple contact plug area 20 and become corresponding contacts for the positive lead connections.

Figure 4:
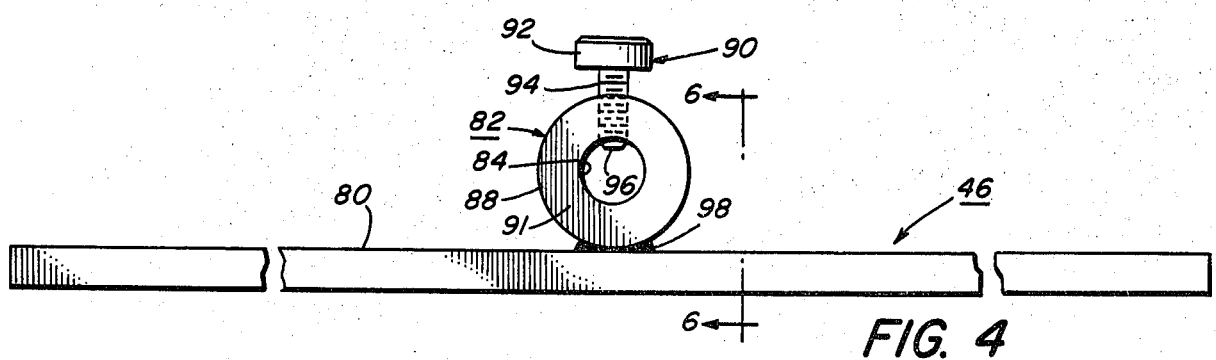
Figure 5:
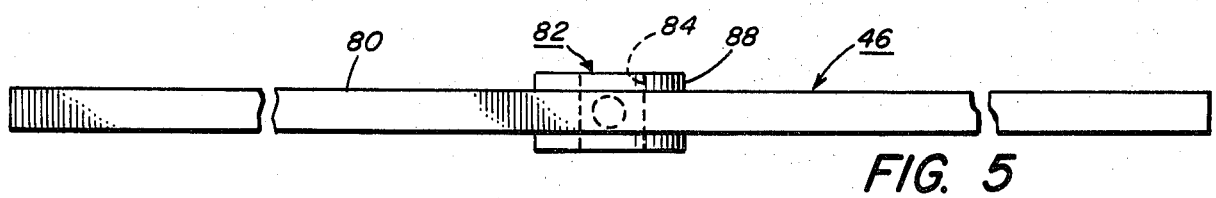
Figure 6:
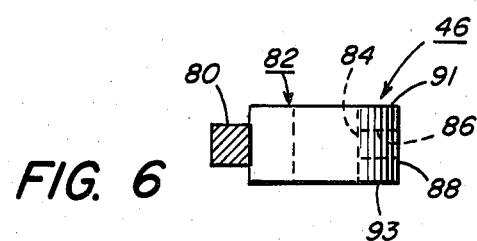
Figures 8, 9:
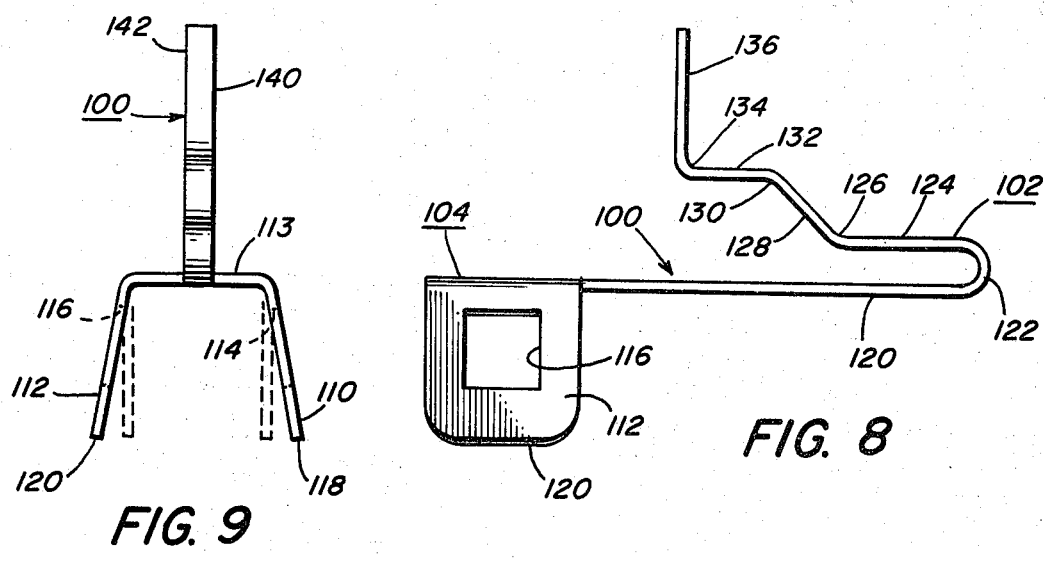
Figure 7:
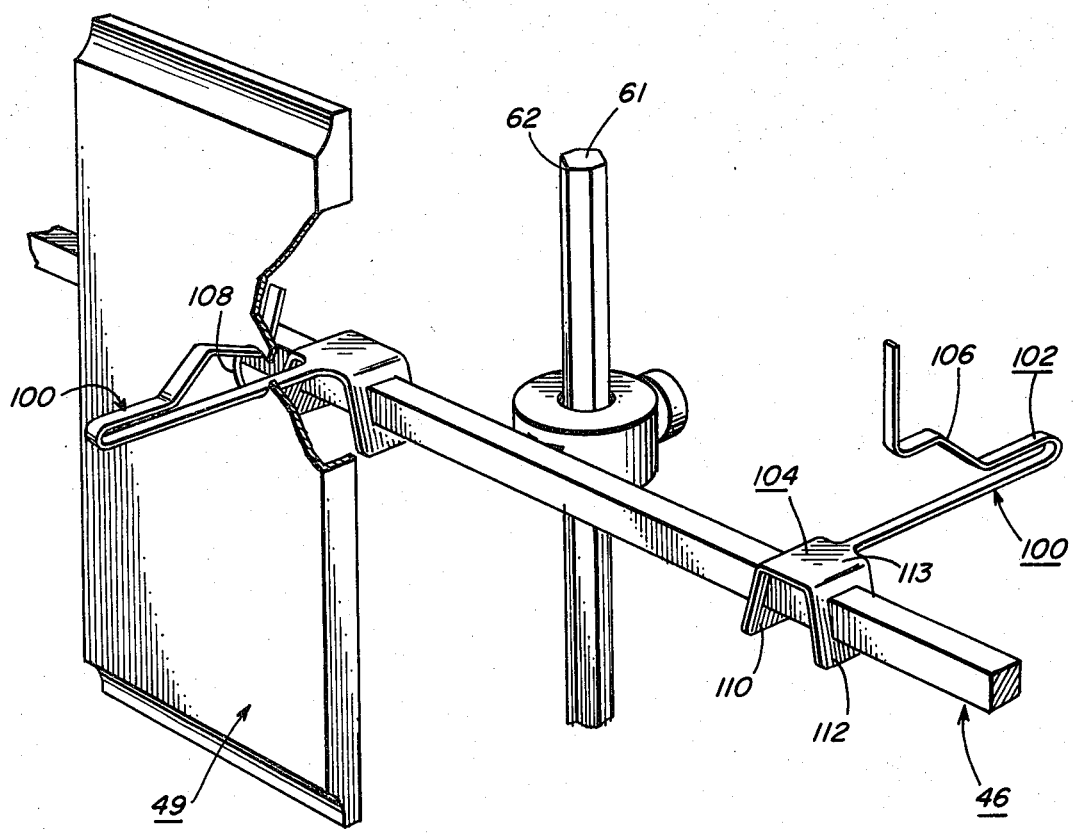
Figure 1:
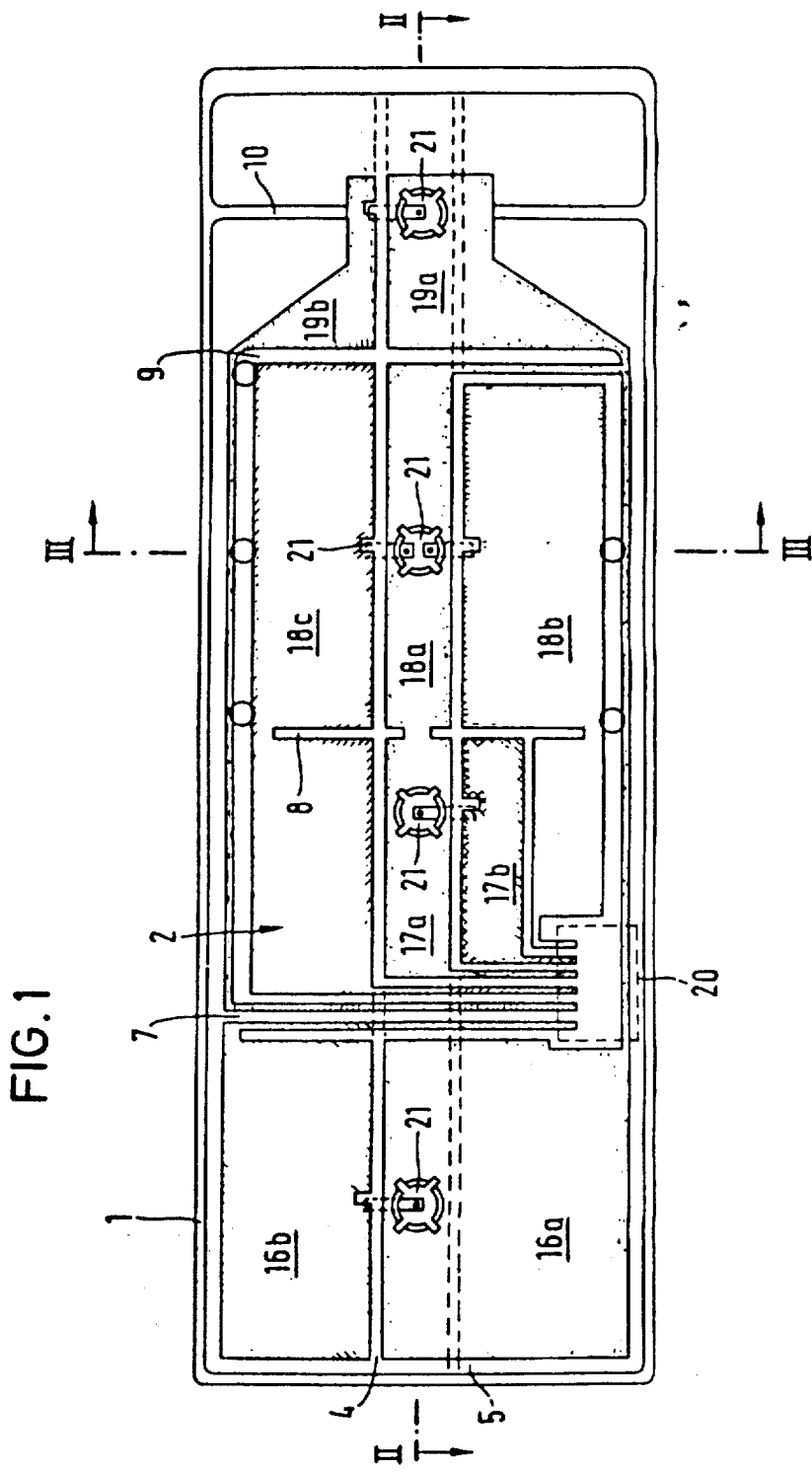
Figure 2:
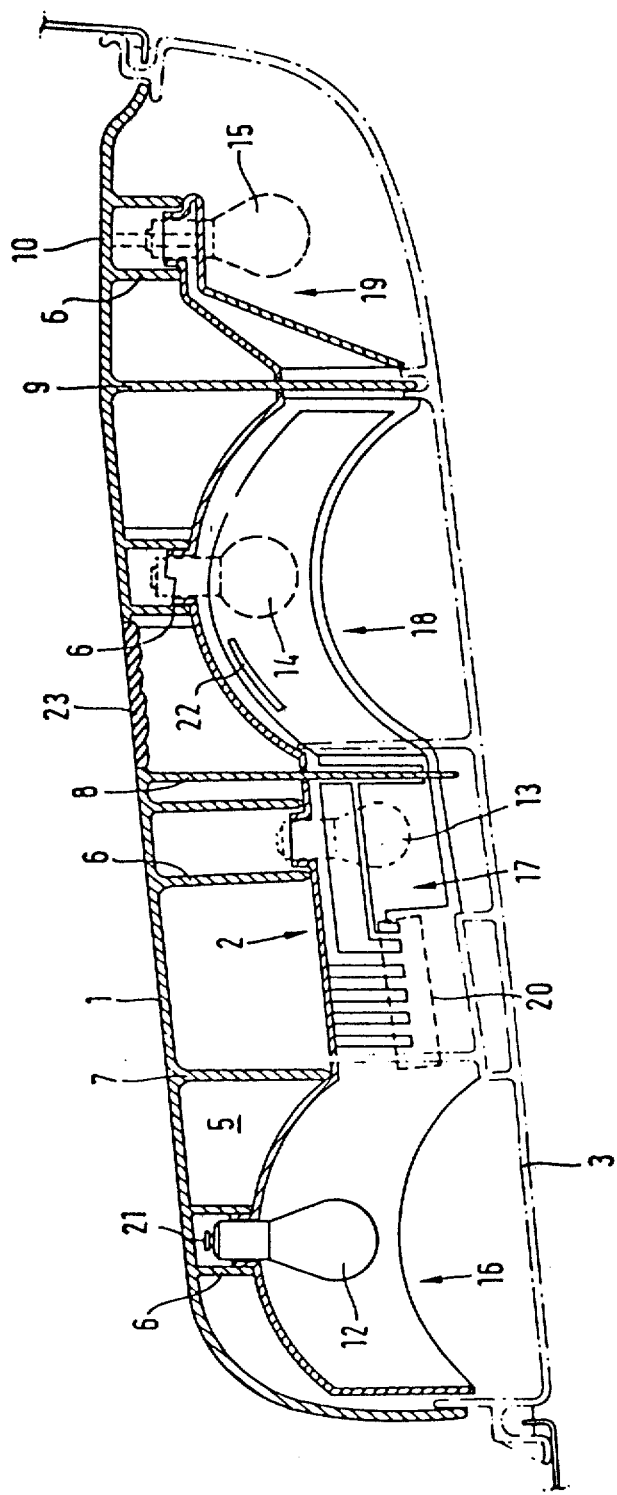

The material of the lampholder 2 has, for example, a plate-thickness of 0.44 mm and the contacts at the plug connection area 20 are formed from conductor runs, which are also made from the material of the lampholder 2 and, as can be seen from FIG. 4, are brought to the required dimension of 0.8 mm by being bent through 180 degrees.

The horizontal bars 4 and 5, and the vertical bars 7, 8, 9 and 10 are provided at corresponding points with recesses to pass the various conductor run strips; and the conductor strips are fixed to bars in a known fashion by plastic deformation of the material of the bars.

The various horizontal and vertical bars are formed so that their front edges provide support partitions 11 for the separate light emitting areas. The support partitions 11 are disposed in accordance with the structure of the lens element 3 so that they do not impair the efficiency of the light reflected from the corresponding bulbs.

The conductor strips routed to the multiple contact plug connection area 20 are preferably disposed in that portion of the rear light of a vehicle which is covered by a rear reflector within the lens element 3.

In those cases where the invention is employed in the rear light of a motor vehicle, the bulb 12, along with its associated reflector sub-areas 16a and 16b, functions as a rear fog light. The bulb 13, with its cylindrical reflector surfaces 17a, 17b, and portions of reflector sub-areas 18b and 18c, functions as a reversing (back-up) light. The two-filament bulb 14, with its associated reflector sub-areas 18a, 18b and 18c, functions both as a running light and a brake light. The bulb 15, with its associated reflector sub-areas 19a and 19b functions as a turn signal light.

Figures 2, 3:
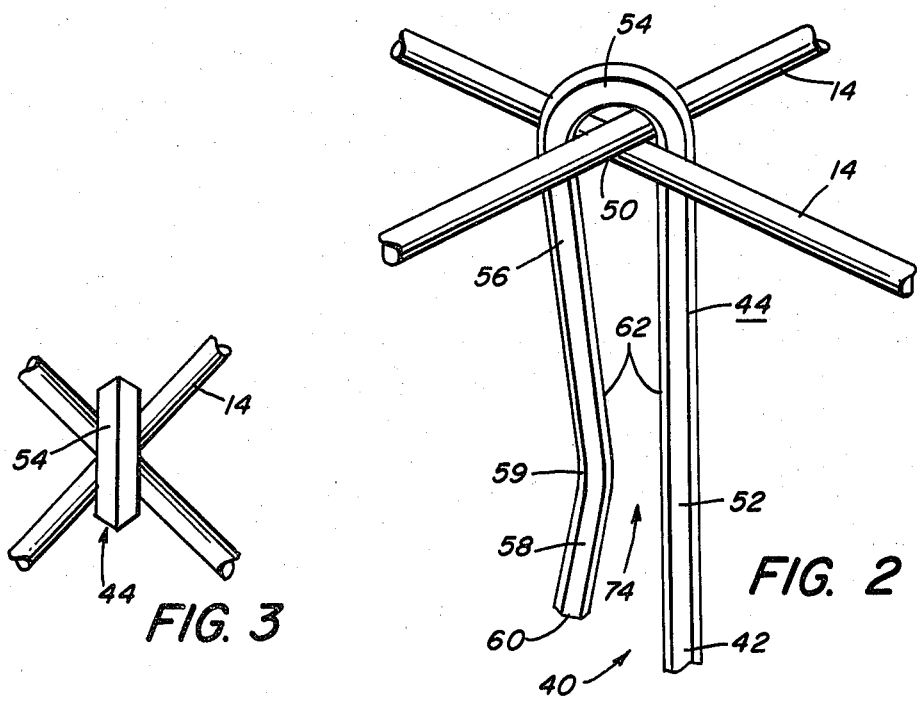
FIG. 2 is a horizontal section along the line II—II in FIG. 1 with the lens element indicated by broken lines.
FIG. 3 is a vertical section along the line III—III in FIG. 1 with the lens element indicated by broken lines and FIG. 4 is a vertical partial section through the lamp assembly shown in FIG. 1 in the area of the multiple contact plug connection.

A slot 22 is shown in FIG. 2 and is provided in a reflector surface in order to provide rear luggage compartment illumination through a lens element 23 on the rear portion of the housing 1.

The lamp housing of the present invention provides certain advantages, due to the integral formation of reflector parts that perform multiple functions of light reflection and electrical conductors between the connector and the bulb.

Other advantages are due to the reduction of components which in turn provides a weight savings.

I claim:

1. A lamp assembly comprising:
    a housing which includes a rear cover portion and a front lens element defining a plurality of light emitting areas;
    a plurality of light emitting lamps mounted within said housing and correspondingly associated with a plurality of light emitting areas of said lens element; and
    a light reflector element formed of an electrically conducting sheet material, subdivided into a plurality of electrically isolated areas for each defined light emitting area, wherein each subdivision provides separate electrical connection between an externally supplied voltage source and its associated lamp.

2. A lamp assembly as in claim 1 wherein said cover is formed of an electrically insulating material and includes a plurality of horizontal and vertical bars having forward edges that define a surface curvature corresponding to each light emitting area and said reflector element is attached to the forward edges of said horizontal and vertical bars to assume the shape of said surface curvature.

3. A lamp assembly as in claim 2, wherein at least one of the electrically isolated areas of the reflector element in each defined light emitting area is continuous with one electrically isolated area of the reflector element in another defined light emitting area to provide the same voltage potential to contacts on respectively associated lamps.

4. A lamp assembly as in claim 3, wherein each of said lamps has a conductive material base and at least one central electrical contact protruding and insulated from said base and one of said continuous portions of said reflector element interconnects a plurality of associated lamp bases and provides a ground connection therefor.

5. A lamp assembly as in claim 4, wherein said reflector element contains a light transparent aperture for passing light from an associated lamp towards a portion of said rear cover, and said rear cover includes a lens element at said portion to allow said light from said associated lamp to exit said rear cover.

6. A lamp assembly as in claim 4, wherein said sheet material forming said reflector element forms respective electrical conductor runs from said electrically isolated areas to a location within said housing wherein an electrical connector from said externally supplied voltage source is connected to said lamp assembly and provides respective electrical terminals for direct connection to said electrical connector.

* * * * *

UNITED STATES PATENT AND TRADEMARK OFFICE
CERTIFICATE OF CORRECTION

PATENT NO. : 4,408,265

DATED : October 4, 1983

INVENTOR(S) : Heinz Dick

It is certified that error appears in the above-identified patent and that said Letters Patent is hereby corrected as shown below:

The title page should be deleted to appear as per attached title page.

The sheets of drawings consisting of Figures 1-9 should be deleted to appear as per the attached sheets.

Signed and Sealed this

*Eleventh* Day of *December 1984*

[SEAL]

*Attest:*

*Attesting Officer*

GERALD J. MOSSINGHOFF

*Commissioner of Patents and Trademarks*

United States Patent [19]

Dick

[11] 4,408,265
[45] Oct. 4, 1983

[54] LAMP, IN PARTICULAR FOR MOTOR VEHICLES

[75] Inventor: Heinz Dick, Odenthal, Fed. Rep. of Germany

[73] Assignee: Ford Motor Company, Dearborn, Mich.

[21] Appl. No.: 254,026

[22] Filed: Apr. 14, 1981

[30] Foreign Application Priority Data

Apr. 24, 1980 [DE] Fed. Rep. of Germany ...... 3015693

[51] Int. Cl.³ .............................................. F21V 7/22
[52] U.S. Cl. ............................ 362/238; 339/17 D; 362/80; 362/240; 362/241; 362/247; 362/297; 362/310; 362/327; 362/335; 362/347; 362/308; 362/346; 362/362
[58] Field of Search ........... 362/61, 297, 346, 82, 362/80, 240, 238, 241, 347, 350, 352, 458; 339/17 D, 176 L

[56] References Cited

U.S. PATENT DOCUMENTS

| | | | |
|---|---|---|---|
| 2,968,033 | 1/1961 | Kreitzberg | 362/346 X |
| 3,015,718 | 1/1962 | Petri | 339/17 D |
| 4,060,721 | 11/1977 | Hanson et al. | 362/346 X |
| 4,061,913 | 12/1977 | Ross | 362/352 X |
| 4,246,632 | 1/1981 | Hancox | 362/61 X |

FOREIGN PATENT DOCUMENTS

| | | |
|---|---|---|
| 1131536 | 6/1962 | Fed. Rep. of Germany . |
| 7211646 | 12/1972 | Fed. Rep. of Germany . |
| 2441330 | 3/1976 | Fed. Rep. of Germany . |
| 1564605 | 4/1980 | United Kingdom ...... 339/17 D |
| 2074710 | 11/1981 | United Kingdom ...... 362/61 |

Primary Examiner—Peter A. Nelson
Assistant Examiner—John S. Maples
Attorney, Agent, or Firm—Paul K. Godwin, Jr.; Clifford L. Sadler

[57] ABSTRACT

A lamp assembly for containing a plurality of light emitting lamps associated with distinct light emitting areas on a lens element and associated reflectors to direct the light towards the lens element. The light reflector element is formed of an electrically conducting sheet material subdivided into a plurality of electrically isolated areas for each defined light emitting area wherein each subdivision provides separate electrical connection between an externally supplied voltage source and its associated lamp.

6 Claims, 4 Drawing Figures

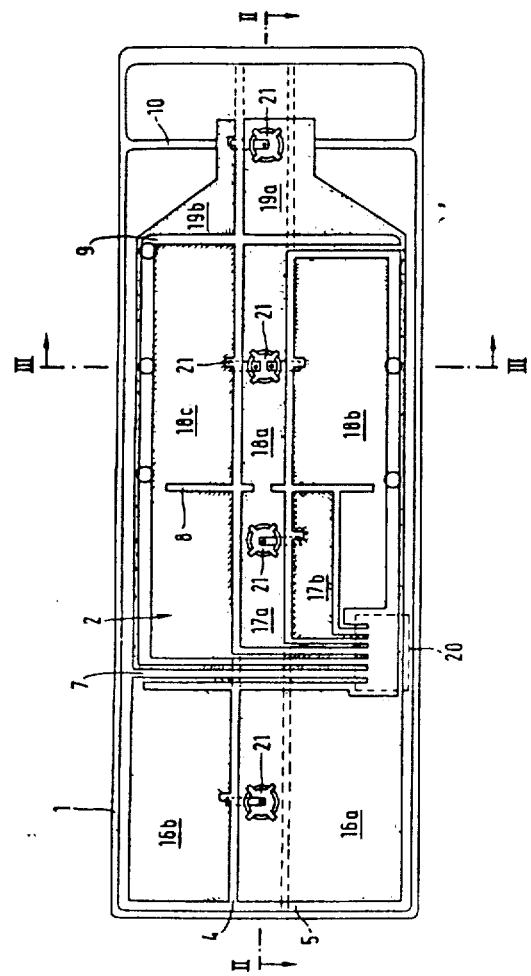

FIG. 3
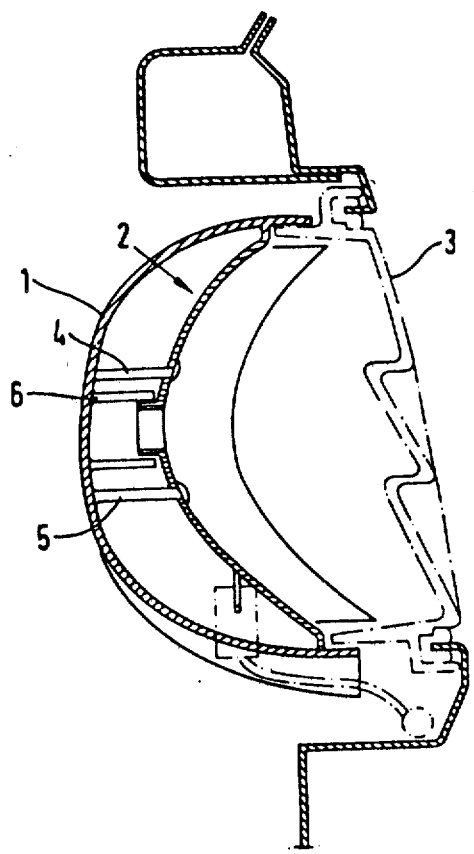
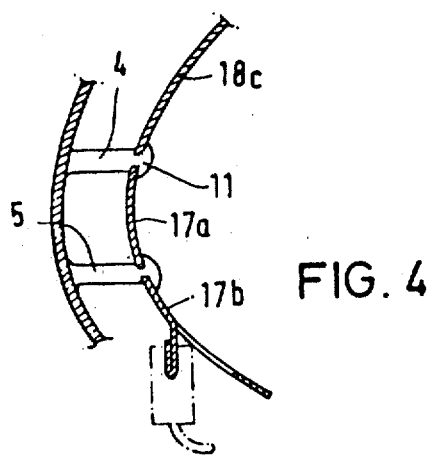
FIG. 4